United States Patent

[11] 3,583,668

| [72] | Inventor | Juha Antti E. Nelimarkka<br>Helsinki, Finland |
| --- | --- | --- |
| [21] | Appl. No. | 850,122 |
| [22] | Filed | Aug. 14, 1969 |
| [45] | Patented | June 8, 1971 |
| [73] | Assignee | Neles Oy<br>Helsinki, Finland |

[54] TIGHT SHUTOFF BUTTERFLY VALVE ASSEMBLY
8 Claims, 1 Drawing Fig.

| [52] | U.S. Cl. | 251/151, 251/306 |
| --- | --- | --- |
| [51] | Int. Cl. | F16k 1/226 |
| [50] | Field of Search | 251/148, 151, 152, 306, 308, 367 |

[56] References Cited
UNITED STATES PATENTS

| 3,080,145 | 3/1963 | Swain | 251/306 |
| --- | --- | --- | --- |
| 3,290,001 | 12/1966 | Taylor | 251/306X |
| 3,410,520 | 11/1968 | Mahoney | 251/308X |

*Primary Examiner*—William R. Cline
*Attorney*—Cushman, Darby & Cushman

ABSTRACT: A tight shutoff butterfly valve assembly for controlling the flow of air, gas, oil or other fluids such as pulp or paper stocks and for providing a completely tight seal to the flow even at high differential pressure wherein the assembly includes a two-piece valve body with a centrally mounted circular vane therein and wherein an annular seat is located in a dovetail groove within the valve body, the seat having an inner surface of a first dimension extending into the passageway formed by the valve body, an outer surface of a second and larger linear dimension than the dimension of the inner surface and two side surfaces extending between the inner and outer surfaces of the seat. The outer surface of the seat has a groove for facilitating the deformation of the seat upon closure of the vane and upon contact by the vane with the inner surface of the seat. The seat also includes two generally U-shaped portions which fit around the shaft of the valve assembly to facilitate easy removal and replacement of the seat without requiring the disassembly of the vane and the shaft. The butterfly valve may also be placed in assembly at the end of a first pipe and a vanstone ring flange may be removably bolted to the valve so as to enable the optional connection of a second pipe to the valve.

INVENTOR
JUHA ANTTI E. NELIMARKKA
BY Cushman, Darby & Cushman
ATTORNEYS

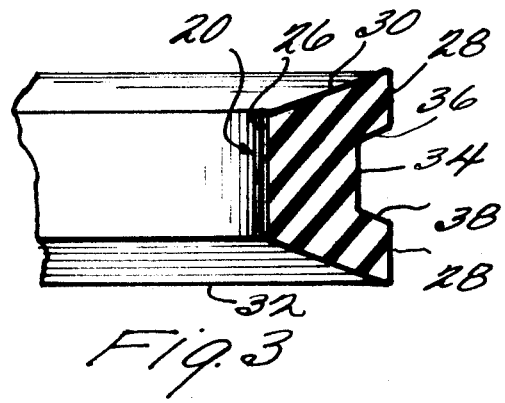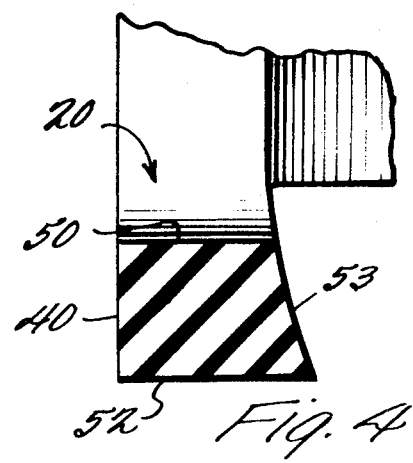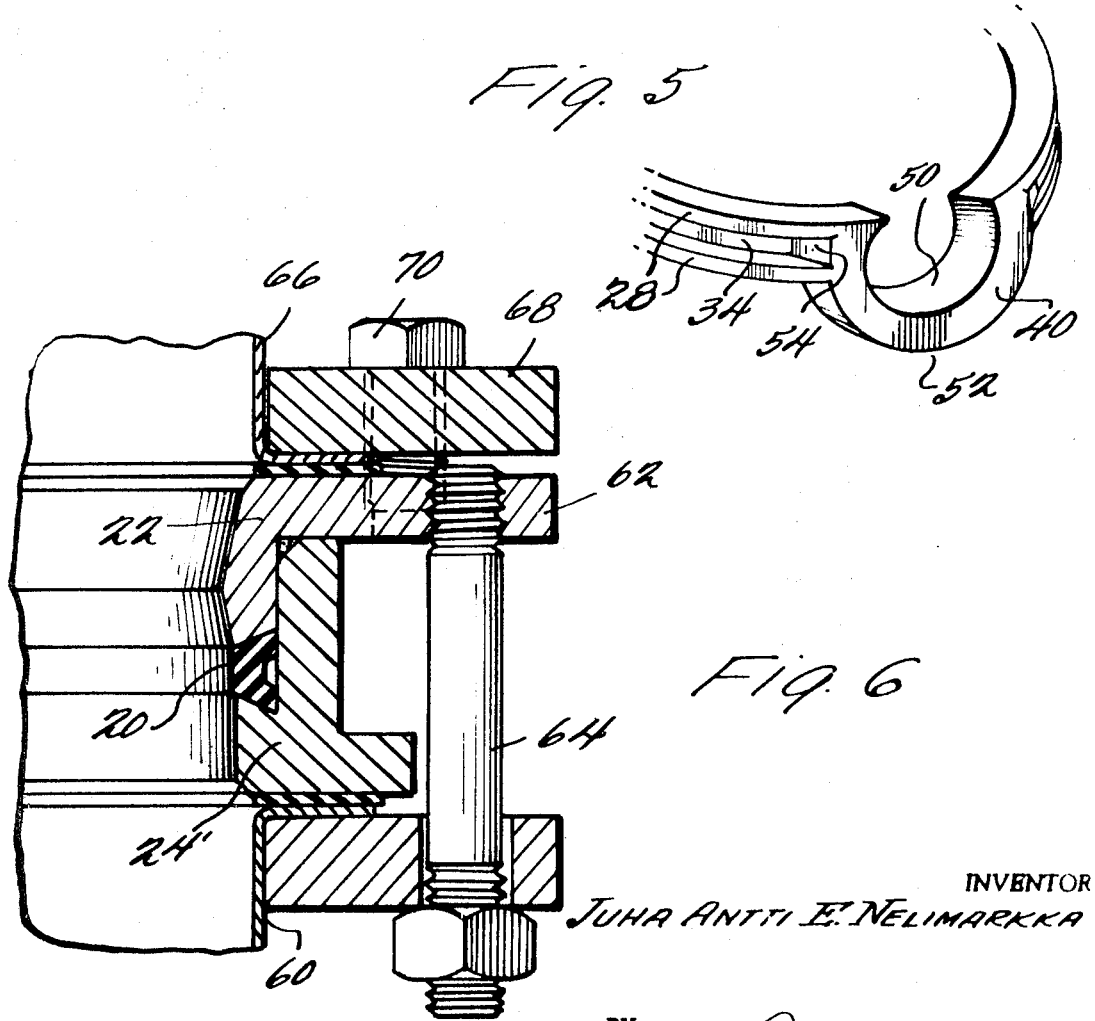

TIGHT SHUTOFF BUTTERFLY VALVE ASSEMBLY

The present invention relates to butterfly valves and assemblies and more particularly to a tight shutoff butterfly valve of unique configuration wherein the valve includes a seat of relatively small cross section which is designed for the optimum sealing of the valve in conjunction with the vane thereof and wherein the seat is readily replaceable from one side of the body of the valve so as not to require the disassembly of the vane and shaft of the valve. The invention also relates to a unique assembly for mounting the valve at the end of a pipe wherein another pipe may be optionally connected to the valve by means of a vanstone ring flange.

The general purpose of this invention is to provide a tight shutoff butterfly valve and butterfly valve assembly which contemplates a unique valve seat arrangement and a unique means by which the valve may be mounted at the end of a pipe so as to provide for the optional connection for another pipe beyond the valve.

An object of the present invention is the provision of a unique tight shutoff butterfly valve for providing a completely tight seal to the flow of air, gas, oil or other fluids such as pulp or paper stocks even at high differential pressure.

Another object is to provide a unique butterfly valve assembly wherein the valve is mounted on the end of a pipe so as to allow the optional connection of another pipe beyond the valve.

Other objects and features of the invention will become apparent to those of ordinary skill in the art as the disclosure is made in the following description of a preferred embodiment of the invention as illustrated in the accompanying sheets of drawings in which:

FIG. 3 is an enlarged view of the cross section of the seat illustrated in FIG. 2;

FIG. 4 is an enlarged cross section of the U-shaped portion of the seat taken on the line 4—4 of FIG. 2 looking in the direction of the arrows;

FIG. 5 is a fragmentary perspective view of the seat of the valve;

FIG. 6 is a fragmentary top view, in section, of the valve assembly at the end of a pipe with the optional connection of another pipe beyond the valve.

Figure 1:
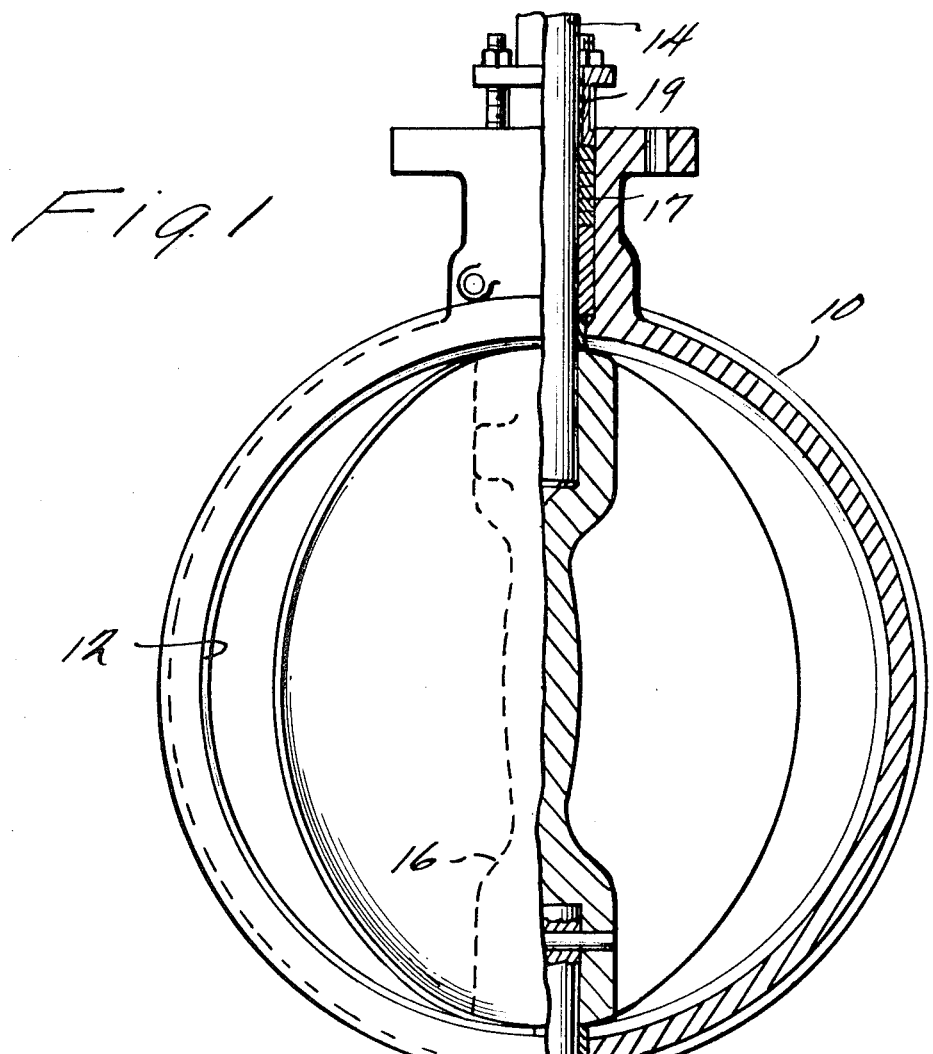
FIG. 1 is a front elevation, partly in section, of a preferred embodiment of the invention.

With reference now to the drawings, wherein like reference characters designate like or corresponding parts throughout the several views, there is shown in FIG. 1 a valve body 10 which has a flow passageway 12 therethrough. The valve also includes a shaft 14 which extends through the valve body in a direction substantially perpendicular to the flow of the fluid or other material passing through the open valve. A substantially circular and streamlined vane 16 is mounted on the shaft and centrally within the valve body 10 for rotation within the body and with the shaft. The valve further includes packing trays 17 and packing glands 19 and the shaft 14 protrudes externally of the glands 19 whereby the normally unbalanced force in the vane 16 is reduced to zero.

Figure 2:
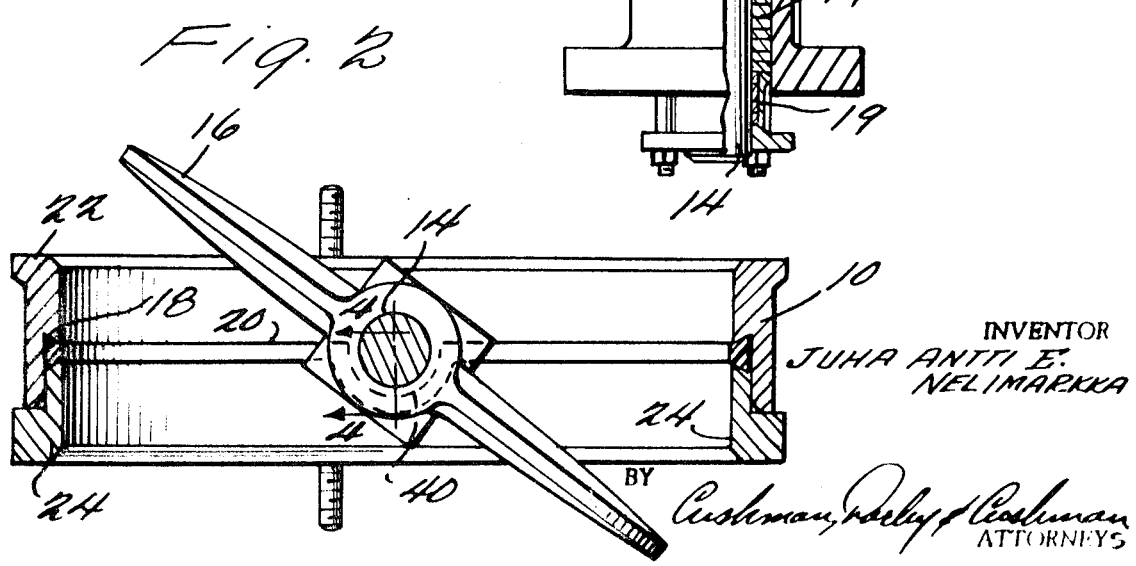
FIG. 2 is a top view, partly in section, of the valve shown in FIG. 1.

With reference now to FIG. 2, there is shown a dovetail groove 18 which opens into and surrounds the passageway of the valve and which contains a generally annular seat 20 of relatively small cross section which is in removable and contiguous relationship with the valve body 10 within the dovetail groove 18. The valve body 10 is comprised of two separable portions 22 and 24, which when coupled together form the dovetail groove 18 in which the annular seat is placed.

The annular seat 20 is shown in enlarged cross section in FIG. 3 and includes an inner surface 26 of a first dimension which extends into the passageway of the valve to be engaged by the vane when the vane is closed. An outer surface 28 is also provided which has a larger linear dimension A than the corresponding dimension of the inner surface 26, and two side surfaces 30 and 32 extend between the inner and outer surfaces of the seat. The outer surface 28 has a groove therein which extends substantially all the way around the seat and which simply and directly provides room for the seat material to be deformed as the vane closes. When the vane is closed the seat material is deformed by the contact of the vane with the inner surface 26 and the material is displaced radially outward and into the groove space behind the seat. As a result, waving and bulging of the seat is avoided.

The groove is defined by a first surface 34 which is substantially parallel with the inner surface 26 and which is recessed from the outer surface 28. The groove is further defined by a pair of sidewalls 36 and 38 which are in respective parallel relationship with the side surfaces 30 and 32 of the seat. The width of the inner surface 34 is preferably about one-third of the linear dimension A of the outer surface 28 of the seat but may be anywhere in the range of from one-fourth and three-fourths of the linear dimension A.

The size of the seat 20 is also of considerable importance since a thick or heavy seat will expand quite a bit with temperature changes in the valve. As result of this expansion, the additional expanded seat material must be moved, waved, and bulged in conventional designs; however, in the configuration of this invention the groove behind the seat plays an important part in that it gives the expanded material a place to go. However, the seat of this invention is of such small mass and dimension that this swelling which occurs in the seats presently known in the prior art is at an absolute minimum.

As partially illustrated in FIG. 2 and as shown in FIG. 5, the seat 20 includes two generally U-shaped portions 40 which fit around the shaft 14 in a unique manner so as to facilitate the easy removal and replacement of the seat without requiring the disassembly of the vane and the shaft. With this particular configuration of the seat, it becomes necessary only to remove the valve body portion 24, for example, in order to remove the seat rather than to completely disassemble the shaft 14 and the vane 16. These U-shaped portions have an inner surface 53 which lies in the plane of a sphere, as illustrated in FIG. 4, which is an enlarged cross section of one of the U-shaped portions taken on the line 4—4 of FIG. 2 looking in the direction of the arrows. The U-shaped portions include an inner curved surface 50 which is adjacent to the shaft 14 and an outer surface 52, which is of a greater linear dimension than the linear dimension of the surface 50, wherein the outer surface is in contiguous relationship with the portion 24 of the valve body and wherein the portion 24 includes an arcuate surface (not shown) to engage the outer curved surface 52 of the U-shaped portions of the seat. The outer surface 52 is preferably oriented toward the high pressure side of the flow to aid in the prevention of fluid leakage when the vane 16 is in the closed position.

The seat also includes two sloping surfaces 54 located adjacent each of the U-shaped portions for joining the first surface 34 of the groove with the outer surface 28 of the seat. Thus, the groove is present all around the outer surface of the seat with the exception of those areas immediately adjacent to and defined by the two U-shaped portions of the seat, and the sloped surfaces 54 provide for a transition from the groove to the U-shaped portions of the seat.

With reference now to FIG. 6 there is shown the butterfly valve assembly of this invention at the end of a first pipe and flange 60. In this embodiment the portion 22' of the valve body includes a flange 62 integral therewith which may be connected to the pipe flange 60 by means of a bolt or other conventional fastening means 64. The valve flange 62 includes a plurality of bolt holes therein circumferentially spaced apart from one another by a distance of one-half a standard bolt spacing and the first pipe 60 and its associated flange is bolted to the valve body and to the portion 22' at a first series of the bolt holes which are respectively spaced apart by a standard bolt spacing. Under this condition, the valve may be mounted at the end of the pipe 60; however, this embodiment of the invention provides for the optional connection of another piece of pipe 66 and its associated flange beyond the valve by means of a vanstone ring flange 68 which may be rotated by one-half a bolt spacing so that the bolts, e.g. bolt 70, may be bolted to the flange 62 at a second series of the bolt holes in the flange 62 which are spaced apart by a standard bolt spacing so that the bolts, e.g. bolt 64, which hold the valve to the first pipe 60 will not interfere with the bolts, e.g. bolt 70, which connect the optional pipe 66 onto the valve. Thus, the valve may be held onto the end of the pipe 60 to form the end portion thereof or it may be connected between the pipes 66 and 60.

Figure 7:
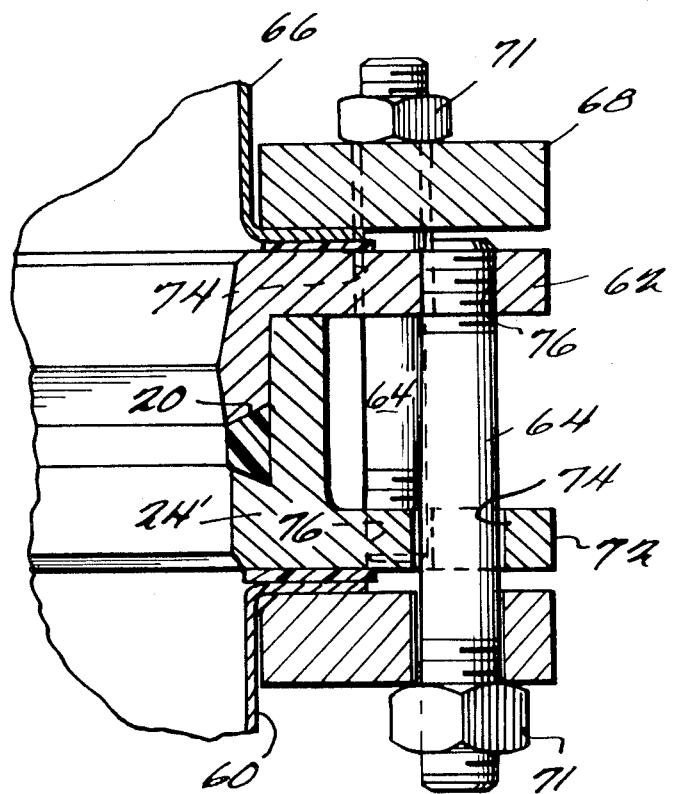
FIG. 7 is a fragmentary top view, in section, of another embodiment of the valve assembly of FIG. 6.

FIG. 7 shows still another embodiment which is a modification of that illustrated in FIG. 6. In this embodiment the portion 24' of the valve body includes a flange 72 integral therewith. Identical studs or bolts 64 are used which pass through similar holes 74 in the flanges 62 and 72. Each of the studs 64 is also tapped into identical holes 76 in the flanges 62 and 72 and are held by identical nuts 71, for example. Thus, one-half the number of the studs 64 are held in place by the flange 62 while the other half are held in place by the flange 72.

The present invention provides for a unique butterfly valve assembly which overcomes the problems of conventional butterfly valves. For example, when a conventional tight shutoff butterfly valve closes the vane comes into the seat material which is of a smaller inside diameter than the diameter of the vane. The seat therefore interferes with the movement of the vane in its attempt to become closed and large forces are needed to make the seat material move ahead of the vane in a wave or bulge. The pressure between the undersized seat against the vane results in the tight closure. When the valve is reopened, the bulge or wave must again be moved by the vane, which movement requires large forces and often times causes damage to the seat. The inclusion of 4 percent or 5 percent consistency pulp stock, for example, adds the additional problem of extra dimension to the vane, since the pulp stock becomes wedged between the vane and the seat material when the vane is closed. The seat material, therefore, must be deformed or bulged an extra amount and either the vane will not close tightly with the pulp stock in the line or it closes tightly but with such force that the seat does not enjoy a very long life. The valve of this invention overcomes these problems by providing the unique groove heretofor described which extends substantially entirely around the outer surface of the seat and wherein the groove is uniquely structured so as to simply and directly provide room for the seat material to be deformed in an optimum manner as the vane closes and comes into contact with the inner surface of the seat. The present invention also provides for a unique assembly whereby the butterfly valve may be mounted at the end of a first pipe to form the end thereof and wherein a second pipe may be optionally connected to the other side of the valve by means of a vanstone ring flange.

Obviously many modifications and variations of the present invention are possible in light of the above teachings. It is therefore to be understood that within the scope of the appended claims the invention may be practiced otherwise than as specifically described.

What I claim is:

1. A tight shutoff butterfly valve for controlling the flow of air, gas, oil or other fluids such as pulp or paper stocks and for providing a completely tight seal to said flow even at high differential pressure, wherein said valve comprises:

a valve body having a flow passageway therethrough and a dovetail groove opening into and surrounding said passageway;

a shaft extending through said valve body in a direction substantially perpendicular to said flow;

a substantially circular vane member mounted on said shaft and within said valve body for rotation within said body with said shaft;

a generally annular seat of relatively small cross section in removable and contiguous relationship with said valve body within said dovetail groove;

said seat having an inner circular surface of a first dimension extending into said passageway for completely engaging the outer portion of said circular vane member when the valve is closed, an outer surface of a second and larger linear dimension than said first dimension, and two side surfaces extending between said inner and outer surfaces;

said outer surface having a groove therein for facilitating the deformation of said seat upon closure of said vane member and upon contact by said vane member with said inner surface of said seat, said groove being defined by a first surface substantially parallel with said inner surface and recessed from said outer surface and further defined by a pair of sidewalls substantially in respective parallel relationship with said side surfaces of said seat;

said seat further including two generally U-shaped portions which fit around said shaft to facilitate easy removal and replacement of said seat;

said U-shaped portions having an inner surface which lies in the plane of a sphere for improving the sealing qualities of said seat; and said seat further having two sloping surfaces adjacent each of said U-shaped portions for joining said first surface of said groove with the outer surface of said seat.

2. The valve of claim 1 wherein said shaft is mounted on the centerline of said valve body.

3. The valve of claim 2 wherein said U-shaped portions are tapered in cross section so that the inner surfaces thereof adjacent to said shaft are of a smaller linear dimension in the direction parallel with said shaft than the corresponding linear dimensions of said outer surfaces thereof which are contiguous with said valve body and wherein the inner surfaces of said U-shaped portions is curved to conform to the surface of said valve shaft.

4. The valve of claim 3 wherein said valve body is comprised of two separable portions whereby said seat may be easily replaced by merely removing one of said portions without requiring the disassembly of said valve and said shaft.

5. The butterfly valve of claim 4 in assembly at the end of a first pipe wherein said valve body includes a flange integral with one of said portions thereof, said flange being bolted to said first pipe;

said valve body flange having bolt holes therein circumferentially spaced apart from one another by a distance of one-half a standard bolt spacing and said first pipe being bolted to said valve body flange at a first series of said bolt holes respectively spaced apart by a standard bolt spacing;

a vanstone ring flange removably bolted to said valve body flange to enable the optional connection of a second pipe to said valve at the side of said valve opposite to that which is adjacent to said first pipe;

said vanstone ring flange being removably bolted to said valve body flange at a second series of said bolt holes respectively spaced apart by a standard bolt spacing whereby the bolts which hold said valve to said first pipe do not interfere with the bolts which removably hold said vanstone ring flange to said valve.

6. The valve of claim 5 wherein said outer surfaces of said U-shaped portions are oriented toward the high-pressure side of said flow.

7. The valve of claim 4 wherein the width of said inner surface of said groove is in the range of one-fourth to three-fourths of the linear dimension of said outer surface of said seat.

8. The butterfly valve of claim 4 in assembly at the end of a first pipe wherein said valve body includes first and second flanges integral with each of said portions thereof, said first flange being bolted to said first pipe;

a vanstone ring flange removably bolted to the second flange to enable the optional connection of a second pipe to said valve at the side of said valve opposite to that which is adjacent to said first pipe;

each of said valve body flanges having bolt holes therein circumferentially spaced apart from one another by a distance of one-half a standard bolt spacing;

a first plurality of bolts or other fastening means fastening said first pipe to said first valve body flange at a first series of said bolt holes respectively spaced apart by a standard bolt spacing and wherein said first plurality of bolts pass through a first series of holes in said second flange respectively spaced apart by a standard bolt spacing; and a second plurality of bolts or other fastening means fastening said vanstone ring flange to said second flange at a second series of said bolt holes respectively spaced apart by a standard bolt spacing and wherein said second plurality of bolts pass through a second series of holes in said first flange respectively spaced apart by a standard bolt spacing.